C. R. COE & A. C. HOLMES.
Grain-Driers.
No. 148,931. Patented March 24, 1874.
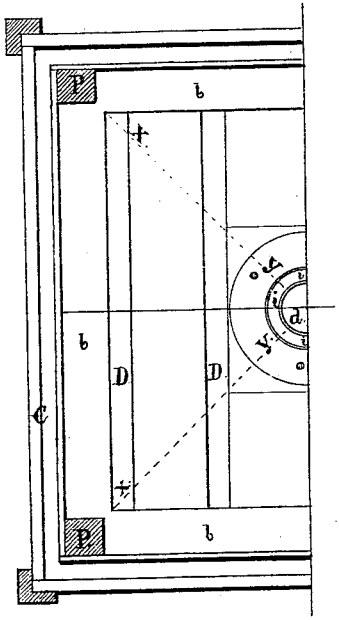
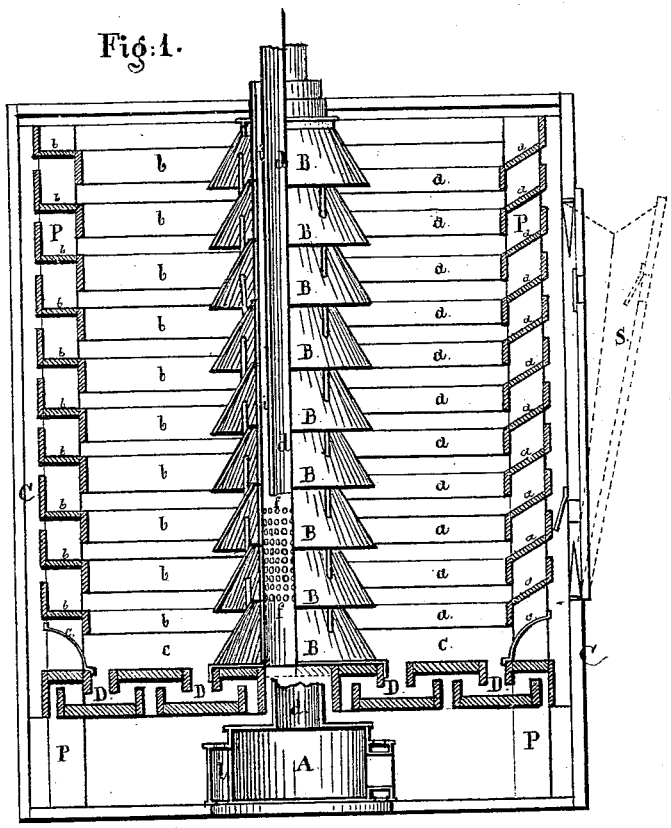
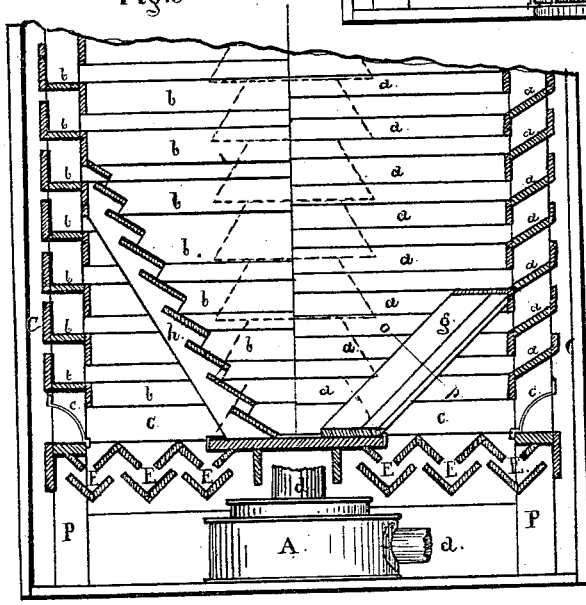
Witnesses:
F. L. Ourand
A. N. Marr
Inventor
Charles R. Coe and
Alfred C. Holmes
per Alexander Mason

UNITED STATES PATENT OFFICE.

CHARLES R. COE, OF McLEAN COUNTY, AND ALFRED C. HOLMES, OF TAZEWELL COUNTY, ILLINOIS.

IMPROVEMENT IN GRAIN-DRIERS.

Specification forming part of Letters Patent No. 148,931, dated March 24, 1874; application filed August 27, 1873.

*To all whom it may concern:*

Be it known that we, CHARLES R. COE, of McLean county, Illinois, and ALFRED C. HOLMES, in the county of Tazewell and in the State of Illinois, have invented certain new and useful Improvements in Grain and Fruit Driers; and do hereby declare that the following is a full, clear, and exact description thereof, reference being had to the accompanying drawings, and to the letters of reference marked thereon, making a part of this specification.

The nature of our invention relates to an improvement in grain and fruit driers; and it consists in the arrangement and combination of parts, which will be more fully described hereafter.

Figures 1 and 3 are vertical sectional views of our invention. Fig. 2 is a plan view of one-half of the drier. Fig. 4 is a cross-section of a part of the bottom of the bin.

The bin in which the fruit or grain is placed to be dried is formed of the four posts P, connected together around the sides by the wooden or iron slats *a b*. These slats may be arranged in either of the two ways shown, so as to prevent the grain or fruit from passing out through the air-spaces between them. Either they may be made in the form of two obtuse angles, as shown at *a*, placed immediately above each other, or in the form of two right angles reversed, as shown at *b*—in both cases leaving sufficient spaces between them to allow the air to pass freely through. The bottom of the bin is intended to be made hopper-shaped, as shown in Fig. 2, and partly in Fig. 3, or perfectly flat, as shown in Fig. 1, whichever may be preferred. When made hopper-shaped, the slats may be arranged in the slanting stair-like manner, as shown at *h*, Fig. 3, or the slats may be arranged as shown at *g*, Fig. 4, where the upper ones are secured together like two right angles connected, and placed over the air-passages. When the bottom is made flat, either it may be made as at D, Fig. 1, the same as the hopper-shaped sides, or as shown at E, Fig. 3, where the slats are secured together like V-shaped troughs, and arranged in a double row, the upper ones being reversed so as to extend over the air-spaces between the lower ones, and thus prevent the escape of grain or fruit through them.

Underneath the bin is placed the furnace A, provided with the smoke-stack *d* and the surrounding jacket *l*, in which the air is heated. Around the smoke-stack is placed the hot-air pipe *i*, perforated about one-third its length, as shown at *f*, so as to let the heated air escape outward into the material being heated. Secured around this pipe are a number of cones, B, which, while preventing the grain or fruit from coming in contact with the pipe, allow the air to freely escape outward.

When heat is used for drying the material in the bin, or it is desired to force currents of air up through it by a pair of bellows, S, or its equivalent device, the bin will be inclosed in a tight box or casing, *c*, having only an opening through the top for the discharge of smoke and air.

All kinds of fruit and grain, including shelled and unshelled corn, nuts, &c., may be dried equally well by our device.

Having thus described our invention, we claim—

1. The metallic open-bottomed cones B B, arranged around the perforated pipe *i* and smoke-pipe *d*, in combination with a furnace, A, of a fruit and grain drier, substantially as and for the purposes set forth.

2. The floor D of a fruit and grain drier, formed of an upper and lower series of angular strips, with air-passages between the upper and lower series, the upper series being placed over and above the openings between the lower strips, leaving air-passage at each side of the upper series, substantially as and for the purposes set forth.

3. In combination with the double-walled and double-floored fruit and grain drier described, having air-passage between the strips forming the inner and outer walls and floor, the hopper-shaped bottom formed of a series of inclined strips, with air-passages between the strips, substantially as and for the purposes set forth.

In testimony that we claim the foregoing we have hereunto set our hands this 16th day of August, 1873.

CHARLES R. COE.
    ALFRED C. HOLMES.

Witnesses:
 WALTER M. HATCH,
 ALBERT B. HOLMES.